July 5, 1960  H. C. SHANK  2,943,601
EXTENSIBLE CEMENT HOG TROUGH
Filed May 8, 1958
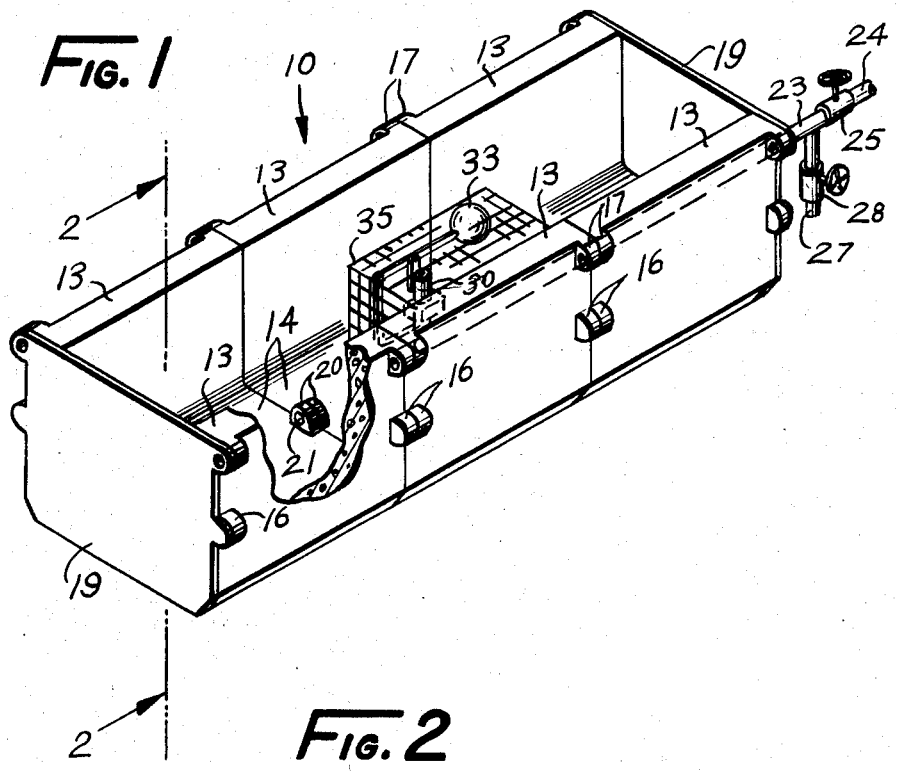
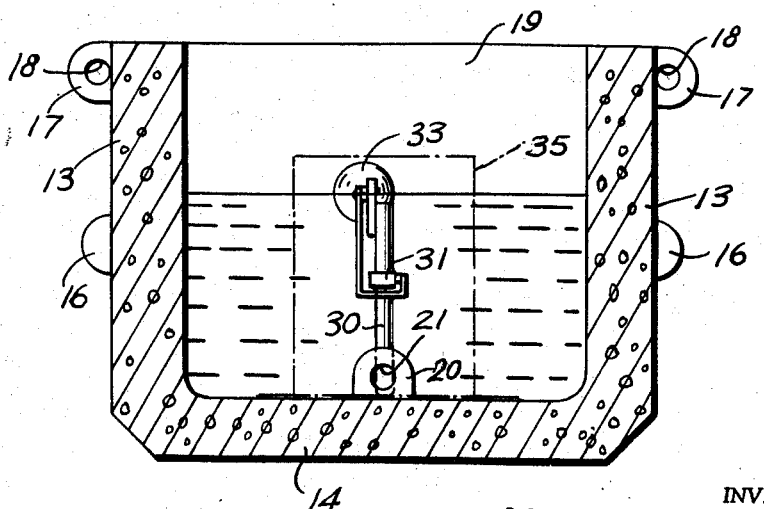
INVENTOR.
Howard C. Shank United States Patent Office 2,943,601
Patented July 5, 1960

2,943,601

EXTENSIBLE CEMENT HOG TROUGH

Howard C. Shank, Route 1, Box 149, Tiro, Ohio

Filed May 8, 1958, Ser. No. 733,887

1 Claim. (Cl. 119—78)

This invention relates to farm equipment and more particularly to a hog trough.

It is an object of the present invention to provide a hog trough that can be used for watering a large number of hogs at one time and which can be enlarged at will for greater capacity.

Another object of the present invention is to provide a hog trough of the above type having automatic water level control means associated therewith so as to constantly maintain the water level at a predetermined point at all times.

Other objects of the invention are to provide an expandable cement hog trough bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a perspective view, with parts broken away, of a hog trough made in accordance with the present invention; and Figure 2 is an enlarged transverse cross sectional view taken along line 2—2 of Figure 1.

Referring now more in detail to the drawing, an expandable masonry hog trough 10 made in accordance with the present invention is shown to be composed of a plurality of substantially identical U-shaped sections that are secured together to form a single unit. Each such U-shaped section includes a base 14 and a pair of spaced apart parallel side walls 13. Both side walls 13 of each U-shaped section are provided with a clamp ear 16 at each end contiguous with the ends thereof for abutting engagement with the identical clamp ears 16 on the next adjacent section. Both side walls 13 of each U-shaped section are also provided with bolt ears 17 contiguous with the opposite ends thereof for abutting engagement with the identical bolt ears 17 on the next adjacent sections, which bolt ears 17 are provided with central bores 18 for receiving clamping bolts therethrough. In actual use, any known means such as bolt and nut means may be used to clamp the bolt ears 17 together, thus providing a water tight connection between adjacent trough sections. Each end of the base 14 of each section is also provided with upstanding ears 20 having longitudinal bores 21 that extend into the interior of the composite trough structure. The bores 21 of these ears 20 may be used to slidably receive the water supply pipe 23 therethrough which extends into the trough from one end, for purposes hereinafter described. (Shown by dotted lines by Fig. 1.)

The opposite ends of the composite trough are closed by means of end plates 19. It will thus be recognized that as many of these sections may be secured together in longitudinally abutting relationship so as to provide a composite trough of substantially any desired length. It is thus possible to start with a small trough consisting of a single section and then add to it as the necessity arises.

The water supply line 23 is connected to a main supply line 24, between which, a manually operated valve 25 is interposed. The tank line 23 is also provided with a downwardly opening outlet or drain pipe 27 having a manually operated valve 28. The inner end of the water supply line 23 has an upwardly extending portion forming a stand pipe 30 having a valve 31 interposed therein that is responsive to the level of a float member 33. The valve 31 can be selectively adjusted so as to close as soon as the float 33 reaches a predetermined level within the trough as the water flows therein thereby keeping a suitable supply of water in the trough at all times. The entire stand pipe and float valve structure is completely encased within a mesh cage 35 so as to prevent injury to the animals and to prevent damage to the valve structure.

In actual use, any number of the U-shaped sections are secured together in the aforementioned manner. By then closing the drain valve 28 and opening the supply valve 25, water will enter the trough through the control valve 31 until the float valve 33 reaches the predetermined maximum level, following which the valve 31 will close and remain closed until the water level therewithin recedes, following which it will again open only sufficiently long enough to permit the level to be returned to the proper height. Whenever it is desired to clean the trough, it is only necessary to shut the manually operated main supply valve 25, and then open the drain valve 28, whereby the contents of the trough will drain outwardly through the drain pipe 27.

While various changes may be made in the detail construction, it shall be understood that such changes shall be within the spirit and scope of the present invention as defined by the appended claim.

What I claim as new and desire to protect by Letters Patent of the United States is:

An extensible hog trough of the character described for keeping a suitable supply of water in the trough, the supply controlled by float valve means comprising, in combination, a plurality of substantially identical U-shaped sections, two end plates, suitable clamping means for securing said sections together and for securing said end plates at the terminal ends of the end sections secured together to form a water-tight trough, a float-control water supply valve, a float member, a water line connected to a supply line having manually operable inlet and outlet valves extending into the interior of the trough and formed with an upwardly extending portion providing a standpipe intermediate the ends of the trough, said float-control water supply valve interposed in said standpipe and responsive to the movement of said float member whereby a suitable supply of water is maintained when desired, said U-shaped sections having bolt ears at their upper edge portions contiguous with the opposite ends thereof for abutting engagement with the identical bolt ears on next adjacent sections, said bolt ears having horizontal central bores therein for receiving suitable clamping means therethrough, said U-shape sections having clamp ears extending outwardly therefrom intermediate the base and upper edge portions thereof to receive suitable clamping means when desired, each U-shaped section having an upstanding bolt ear at each end of the base portion with longitudinal bores therein to receive suitable clamping means, and a cage enclosing said float-valve, the standpipe and associated movable parts to prevent damage thereto by the cattle drinking water from the trough.

References Cited in the file of this patent

UNITED STATES PATENTS

| | | |
|---|---|---|
| 678,913 | Stephenson | July 23, 1901 |
| 1,506,336 | Combellick | Aug. 26, 1924 |
| 1,563,775 | Miller et al. | Dec. 1, 1925 |